US011988350B2

(12) United States Patent
Jeong et al.

(10) Patent No.: US 11,988,350 B2
(45) Date of Patent: May 21, 2024

(54) VEHICLE LAMP INCORPORATING A MICROLENS ARRAY AND A VEHICLE INCLUDING THE SAME

(71) Applicants: HYUNDAI MOTOR COMPANY, Seoul (KR); KIA CORPORATION, Seoul (KR)

(72) Inventors: Byeong-Ho Jeong, Yongin-si (KR); Se-Wook Oh, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/115,415

(22) Filed: Feb. 28, 2023

(65) Prior Publication Data

US 2024/0110683 A1 Apr. 4, 2024

(30) Foreign Application Priority Data

Oct. 4, 2022 (KR) ........................ 10-2022-0126509

(51) Int. Cl.
*F21V 5/00* (2018.01)
*F21S 41/143* (2018.01)
*F21S 41/20* (2018.01)

(52) U.S. Cl.
CPC ........... *F21S 41/285* (2018.01); *F21S 41/143* (2018.01)

(58) Field of Classification Search
None
See application file for complete search history.

(56) References Cited

U.S. PATENT DOCUMENTS

| | | | | |
|---|---|---|---|---|
| 6,709,135 | B2 | 3/2004 | Couillaud et al. | |
| 10,634,307 | B2 * | 4/2020 | Kim | B60Q 1/0011 |
| 10,738,955 | B2 | 8/2020 | Mouri et al. | |
| 11,415,295 | B2 | 8/2022 | Lee | |
| 11,421,846 | B2 | 8/2022 | Schreiber et al. | |
| 2009/0290204 | A1 | 11/2009 | Hirata et al. | |
| 2020/0182425 | A1 | 6/2020 | Mouri et al. | |
| 2021/0215314 | A1 | 7/2021 | Schreiber et al. | |
| 2021/0231280 | A1 * | 7/2021 | Schreiber | G02B 3/0056 |

(Continued)

FOREIGN PATENT DOCUMENTS

| | | | |
|---|---|---|---|
| JP | 2008158185 | A | 7/2008 |
| JP | 6081519 | B2 | 1/2017 |
| JP | 2020090228 | A | 6/2020 |

(Continued)

*Primary Examiner* — Elmito Breval
(74) *Attorney, Agent, or Firm* — Lempia Summerfield Katz LLC

(57) ABSTRACT

Provided is a vehicle lamp including a light source module. The light source module includes a light source configured to generate and emit light and a microlens array module provided in front of the light source and configured such that light enters the microlens array module. The microlens array module includes an incident lens array configured such that the light enters the incident lens array and including a plurality of incident lenses and an exit lens array provided in front of the incident lens array, configured to receive the light that has entered the incident lens array and emit the light outward, and including a plurality of exit lenses. The exit lens array is configured such that heights of the exit lenses are different in a top-bottom direction of a vehicle.

11 Claims, 8 Drawing Sheets

(56) References Cited

U.S. PATENT DOCUMENTS

| | | | |
|---|---|---|---|
| 2021/0381673 | A1 | 12/2021 | Lee |

FOREIGN PATENT DOCUMENTS

| | | | |
|---|---|---|---|
| JP | 2021135472 | A | 9/2021 |
| KR | 20180094581 | A | 8/2018 |
| KR | 20210072074 | A | 6/2021 |
| KR | 102390805 | B1 | 4/2022 |

* cited by examiner

VEHICLE LAMP INCORPORATING A MICROLENS ARRAY AND A VEHICLE INCLUDING THE SAME

CROSS-REFERENCE TO RELATED APPLICATION

This application claims priority to Korean Patent Application No. 10-2022-0126509, filed on Oct. 4, 2022, the entire contents and disclosure of which is incorporated herein by reference in its entirety.

BACKGROUND

Field

The present disclosure relates to a vehicle lamp and a vehicle including the vehicle lamp, and more particularly, to a vehicle lamp incorporating a microlens array and a vehicle including the vehicle lamp.

Description of Related Art

A microlens array (MLA) is a lens configuration in which a plurality of individual lenses is arrayed. The microlens array is used to spread and concentrate light, and its demand has been gradually increasing in optical systems such as a beam projector, an optical communication, and a light detection and ranging (LiDAR).

FIG. 12 is a side cross-sectional view illustrating the structure of a lamp 1 to which a typical microlens array has been applied. Referring to FIG. 12, a light source 3 that generates and emits light is mounted on a printed circuit board (PCB) 2, and a collimator lens 4 that converts the light emitted from the light source 3 into parallel light is disposed in front of the light source 3. In addition, a microlens module 5 including a plurality of microlenses is provided in front of the collimator lens 4. The microlens module 5 includes: an incident lens array 5*a* facing the collimator lens 4 such that light from the light source 3 enters the incident lens array 5*a* after passing through the collimator lens 4, and an exit lens array 5*b* provided in front of the incident lens array 5*a* which receives light that has entered the incident lens array 5*a* and emits the light to the outside. As illustrated in FIG. 12, a plurality of convex microlenses protrudes from a surface of the incident lens array 5*a* facing the collimator lens 4, and a plurality of convex microlenses protrudes from an exit surface of the exit lens array 5*b*.

In addition, light that has entered the plurality of individual microlenses of the microlens array travels only in a specific direction, and thus may be used to form a specific pattern on the road surface through an optical system having a size of about 10 mm Thus, the microlens array has recently been used as a configuration for performing a welcome light function in a vehicle.

In general, a lighting device such as a head lamp disposed on a vehicle is mainly intended to project light forward. In the past, technological development has been focused on the condensing and diffusivity of light. Recently, technologies for emphasizing the design aspect of the lighting device have been developed. Thus, attempts to apply a microlens array to a vehicle headlamp have been recently made.

In addition, when a microlens array including about 200 micro-optic lenses per module is applied to a lamp, the microlens array may further concentrate light and have the same level of performance as a projection lamp used as a head lamp in the related art, while using a smaller number of microlenses and a smaller size of microlens array.

However, the microlens array of the related art has a limited spread angle of about 15 degrees. Thus, the microlens array cannot perform other lighting functions (e.g., a low beam function) in a vehicle, except for the welcome light function. Accordingly, the use of the microlens array in vehicles is limited.

In a vehicle headlamp, as illustrated in FIG. 13, high intensity of light is required in a hot zone area adjacent to a central portion of a vehicle body, and an emission area is required to be increased in a spread area adjacent to an outer portion of the vehicle body.

Here, as illustrated in FIG. 13, when a vehicle headlamp is comprised of a plurality of MLA modules 5, when all of the plurality of MLA modules 5 have the same module shape and are comprised of the same shape of LEDs, beam width performance may be degraded in the spread area due to the above-described problem of the spread angle.

In order to overcome this problem, it is required to increase the number of the MLA modules or tilt the angle of a specific MLA module. However, increasing the number of the MLA modules may excessively increase material costs, and tilting the angles of some MLA modules may have an adverse effect to the exterior of the vehicle, thereby degrading the aesthetic appearance of the vehicle.

Accordingly, in order to overcome such problems, it is required to develop different types of microlens arrays according to performance requirements for the respective hot zone and spread areas. However, in this case, there may be a problem with redundant development costs, due to the development of different types of lenses. The increased number of components makes it difficult to utilize common components for fabrication cost reduction.

SUMMARY OF THE DISCLOSURE

Accordingly, an objective of the present disclosure considering the above point is to provide a vehicle lamp incorporating a microlens array and a vehicle including the lamp. The vehicle lamp is configured such that light concentration (i.e., a hot zone area) and light spread (i.e., a spread area) may be realized at the same time in a simple manner and fabrication and development costs may be reduced.

In one aspect of the present disclosure, a vehicle lamp includes: a light source module with a light source configured to generate and emit light, and a microlens array module to be positioned in front of the light source and configured such that light enters the microlens array module. The microlens array module may include: an incident lens array including a plurality of incident lenses configured such that the light enters the incident lens array; and an exit lens array including a plurality of exit lenses that is provided in front of the incident lens array, and configured to receive the light that has entered the incident lens array and configured to emit the light outward. The exit lens array may be configured such that heights of the exit lenses are different in a top-bottom direction of a vehicle.

The exit lens array may be configured such that each of exit lenses arranged in a plurality of upper rows, among the plurality of exit lenses, has a first height in the top-bottom direction of the vehicle. And each of exit lenses arranged in a plurality of lower rows, among the plurality of exit lenses, has a second height higher than the first height in the top-bottom direction of the vehicle.

The exit lens array may be configured such that each of exit lenses arranged in a plurality of upper rows, among the plurality of exit lenses, has a first height in the top-bottom direction of the vehicle and exit lenses arranged in a plurality of lower rows, among the plurality of exit lenses, are gradually increased in height as the row thereof is lower so as to be higher than the first height in the top-bottom direction of the vehicle.

The light source module may be a plurality of light source modules in a transverse direction of the vehicle. The plurality of light source modules may include a reference module and eccentric modules, the light source of each of the eccentric modules being positioned eccentric with respect to the reference module in a light source unit.

The eccentric modules may include an inner module disposed inside in the transverse direction of the vehicle with respect to the reference module and outer modules disposed outside in the transverse direction of the vehicle with respect to the reference module. The inner module may be disposed such that the light source thereof is eccentric inward in the transverse direction of the vehicle with respect to the reference module in the light source unit. The outer modules may be disposed such that the light source of each of the outer modules is eccentric outward in the transverse direction of the vehicle with respect to the reference module in the light source unit.

The plurality of light source modules may include a plurality of left modules and a plurality of right modules provided to the left and right of the vehicle when the vehicle is viewed from the front. The plurality of left modules may be configured such that the eccentric modules thereof are more eccentric leftward as being more left in the vehicle with respect to the reference module. The plurality of right modules may be configured such that the eccentric modules thereof are more eccentric rightward as being more right in the vehicle with respect to the reference module.

The plurality of light source modules may include a plurality of Printed Circuit Boards (PCBs), each of which has a plurality of predetermined attachment positions. The eccentric modules may include the light sources attached to the PCBs at different attachment positions, such that the positions of the light sources are eccentric. The light sources may be Light Emitting Diodes (LEDs).

The reference module and the eccentric modules may be configured such that the light source and the microlens array module of the reference module are the same as the light source and the microlens array module of each of the eccentric modules, with the light sources being attached to the PCBs at different attachment positions, respectively.

In another aspect, the present disclosure provides a vehicle including a vehicle lamp. The vehicle lamp may include: a light source module including a light source configured to generate and emit light; and a microlens array (MLA) module provided in front of the light source and configured such that light enters the MLA module. The MLA module may include: an incident lens array configured such that the light enters the incident lens array and including a plurality of incident lenses; and an exit lens array provided in front of the incident lens array, configured to receive the light that has entered the incident lens array and emit the light outward, and including a plurality of exit lenses. The exit lens array may be configured such that heights of the exit lenses are different in a top-bottom direction of the vehicle.

The vehicle lamp may include a plurality of light source modules in a transverse direction of the vehicle. The plurality of light source modules may include a reference module and eccentric modules, the light source of each of the eccentric modules being positioned eccentric with respect to the reference module in a light source unit.

According to the present disclosure, the heights of the lenses of the MLA module are set different in a top-bottom direction with respect to the central portion of the MLA module. The lower the row of lenses with respect to the central portion of the MLA module, the more light the lenses may spread downward. Thus, it is possible to provide a lamp to meet a central light intensity and a beam width in the top-bottom direction using a single type of lenses, thereby reducing investment costs or fabrication costs.

According to the present disclosure, it is possible to provide a headlamp meeting both a desired central light intensity and a beam width by changing only LED attachment positions on the PCBs. Thus, major components such as the MLA module, the collimator lens, and the like may be applied in common to a plurality of modules that constitute the headlamp, thereby reducing investment costs consumed in development of different types of components and fabrication costs resulting from use of different types of components.

In addition, when PCBs are fabricated, a plurality of attachment positions may be formed on each of the PCBs. Since LEDs may be attached to the PCBs at specific attachment positions, the same type of PCBs may be shared across a plurality of modules.

Furthermore, according to the present disclosure, the position of the reference module may also be set with a degree of freedom depending on the skin angle of the headlamp, the distances between the MLA modules, and the like. Thus, components of the head lamp may be shared across different types of vehicles. Accordingly, entire fabrication costs may be reduced.

DETAILED DESCRIPTION

Figure 1:
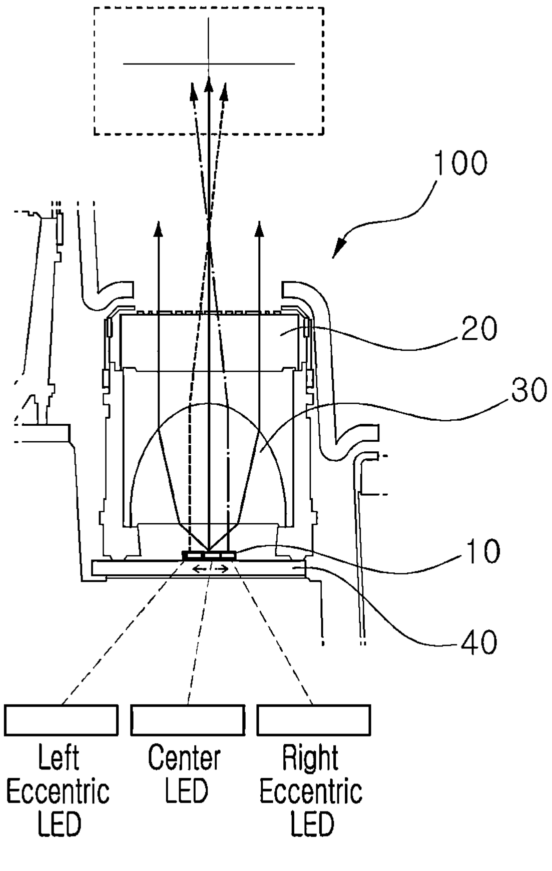
FIG. 1 is a side cross-sectional view illustrating a single module of a vehicle lamp incorporating a microlens array according to an embodiment of the present disclosure.

Hereinafter, some embodiments of the present disclosure are described in detail with reference to the illustrative drawings. It should be understood that the same reference numerals are used to refer to the same or like components throughout the drawings. In the description of embodiments, detailed descriptions of related publicly-known components or functions are omitted when it is determined that the descriptions may make the subject matter in the embodiments of the present disclosure rather unclear.

When a component, device, element, or the like of the present disclosure is described as having a purpose or performing an operation, function, or the like, the component, device, or element should be considered herein as being "configured to" meet that purpose or to perform that operation or function.

FIG. 1 is a side cross-sectional view illustrating a single module of a vehicle lamp incorporating a microlens array according to an embodiment of the present disclosure.

Referring to FIG. 1, a light source module 100 of the vehicle lamp incorporating a microlens array may include: a light source 10 configured to generate light and emit light forward; a collimator lens 30 disposed in front of the light source 10 and configured to receive light entering from the light source 10 and convert the light received from the light source 10 into parallel light; and a microlens array module (hereinafter, referred to as an "MLA module) 20 positioned in front of the collimator lens 30 and including a plurality of microlenses.

The light source 10 may be a Light Emitting Diode (LED), but is not limited thereto.

Figure 12:
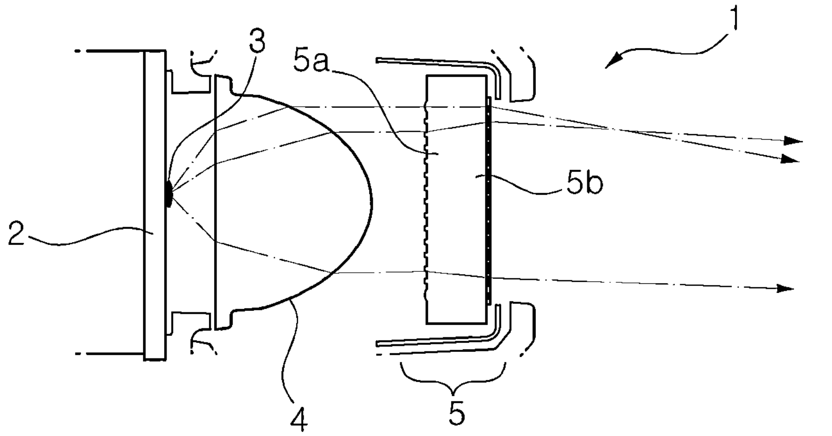
FIG. 12 (PRIOR ART)
FIG. 12 is a side cross-sectional view illustrating the structure of a lamp of a related art to which a typical microlens array is applied.
Figure 13:
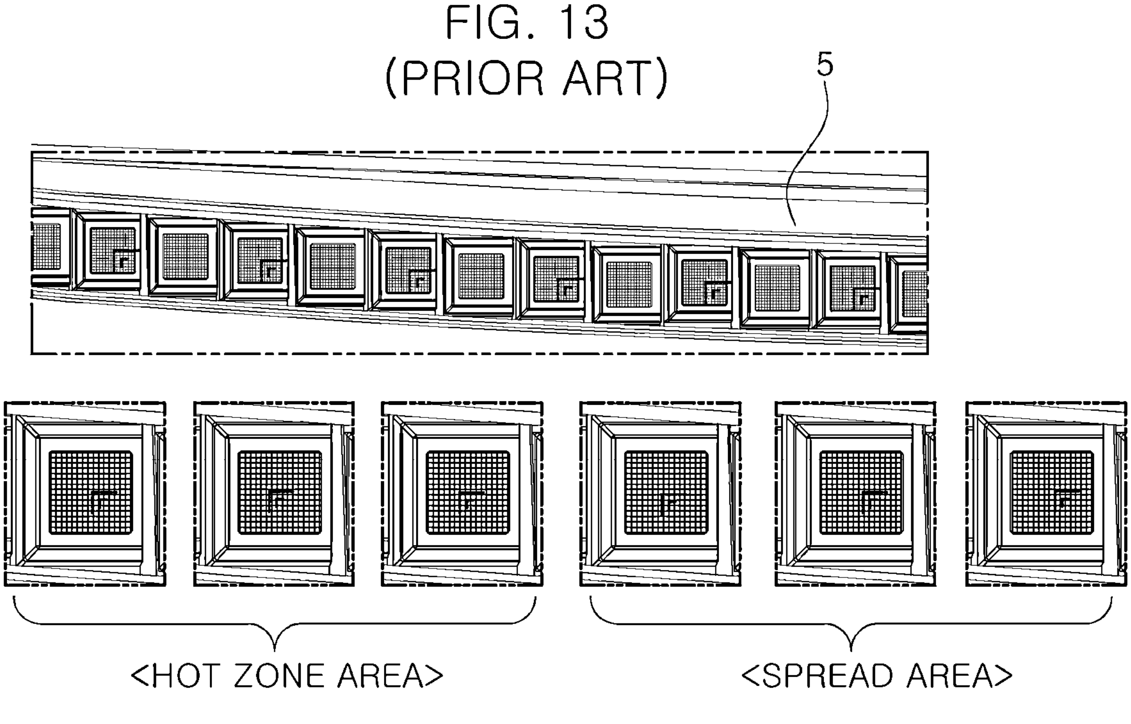
FIG. 13 (PRIOR ART)
FIG. 13 is a front view illustrating a headlamp to which a plurality of MLA modules of the related art is applied.

As described above with reference to FIG. 12, the MLA module 20 may include: an incident lens array facing the collimator lens 30 and configured so that light from the light source 10 enters the incident lens array; and an exit lens array positioned in front of the incident lens array and configured to receive the light that has entered the incident lens array and emit the received light to the outside. Here, as illustrated in FIG. 1, the incident lens array may be configured such that a plurality of microscopic convex lenses protruding toward the collimator lens 30 are arranged. In addition, the exit lens array may be configured such that a plurality of microscopic convex lenses protruding toward a light exiting part are arranged.

In addition, although not shown in FIG. 1, a light shield member may be further provided between the incident lens array and the exit lens array. The light shield member has a slit configured to transmit only a light in a specific direction of light that has passed through the incident lens array.

In addition, the light source module 100 may further include a Printed Circuit Board (PCB) 40 disposed below the light source 10 and configured to allow the light source 10 to be seated thereon. Before mounting of the light source 10, the PCB 40 may be fabricated to have the surface with a plurality of mounting positions at which the light source 10 may be mounted.

In one embodiment, in an assembly process of the light source module 100 using a single type of PCB 40, the light sources 10 may be mounted at different mounting positions on top of the PCB 40, thereby making it possible to fabricate the light source modules 100, which include the light sources 10, disposed at different positions. Thus, when the light source modules 100 with the light sources 10 disposed at different positions are fabricated, PCBs 40 that has the same configuration may be used, thereby reducing fabrication cost or development cost of the light source module 100.

In addition, although FIG. 1 illustrates that LEDs are attached onto the PCB 40 at three positions including a left eccentric position, a central position, and a right eccentric position, the present disclosure is not limited thereto. For example, when it is necessary to eccentrically locate the light source 10 to the left in a plurality of steps, a plurality of left eccentric attachment positions may be provided to the left of the central LED attachment position.

Figure 2:
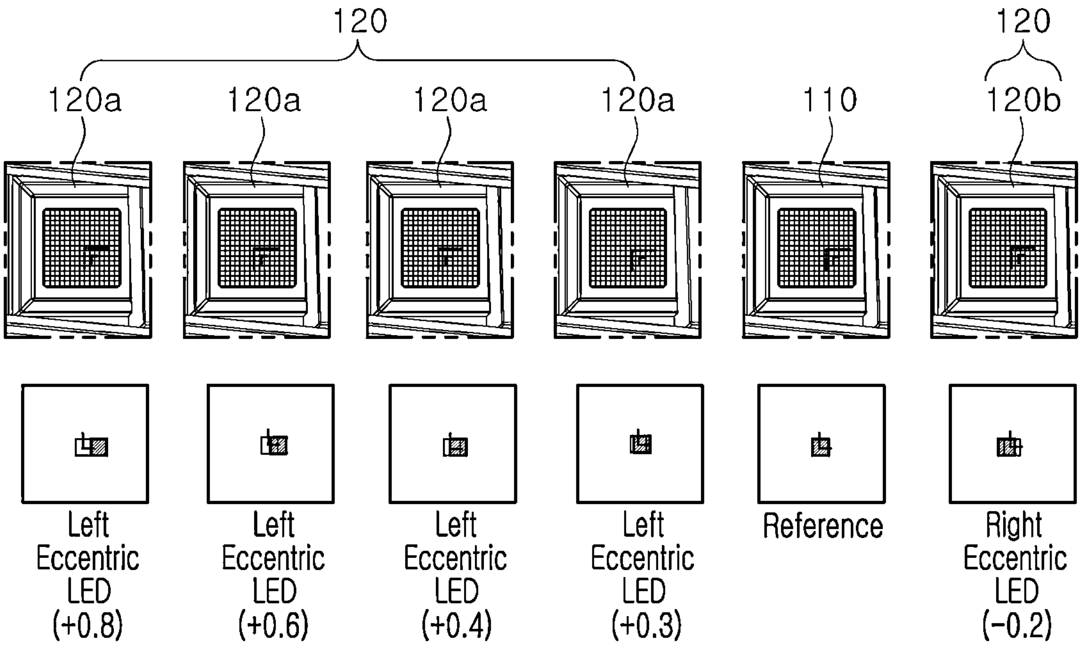
FIG. 2 is a view illustrating the positions of light sources in each of light source modules in the vehicle lamp incorporating a microlens array according to an embodiment of the present disclosure.

FIG. 2 is a view illustrating the positions of the light sources in the light source modules in the vehicle lamp incorporating a microlens array according to the present disclosure. FIG. 2 illustrates the light source modules provided on a left lamp of a vehicle when the vehicle is viewed from the front.

Referring to FIG. 2, a plurality of light source modules 100 of the vehicle lamp according to an exemplary embodiment of the present disclosure may include a reference module 110 in which the light source 10 is provided at a predetermined reference position, and eccentric modules 120, in each of which the light source 10 is eccentric in a specific direction with respect to the position of the light source 10 of the reference module 110. In addition, the eccentric modules 120 may include outer modules **120*a* positioned outside in the transverse direction of the vehicle with respect to the reference module 110 and an inner module 120*b* positioned inside in the transverse direction of the vehicle with respect to the reference module 110** when the vehicle is viewed from the front.

In an embodiment illustrated in FIG. 2, the light source 10 of the reference module 110 may be disposed at the center of the light source module 100.

In addition, the light sources 10 of the outer modules **120*a* among the eccentric modules 120 may be positioned to be more outwardly eccentric in the transverse direction of the vehicle so that the light sources 10 are further away from the reference module 110 with respect to the position of the light source 10 of the reference module 110. In other words, the light sources 10 may be configured so that outward eccentricity in the transverse direction of the vehicle increases the distance between the light sources 10 and the reference module 110**.

In contrast, the light sources 10 of the inner module **120*b* among the eccentric modules 120 may be positioned to be more inwardly eccentric in the transverse direction of the vehicle so that the light sources 10 are further away from the reference module 110 with respect to the position of the light source 10 of the reference module 110. In other words, the light sources 10 may be configured so that inward eccentricity in the transverse direction of the vehicle increases the distance between the light sources 10 and the reference module 110**.

In addition, although FIG. 2 illustrates that a single reference module 110 is provided, the present disclosure is not limited thereto. For example, when high intensity of light is required for a hot zone area in the central area, two or more reference modules 110 may be provided. In addition, although FIG. 2 illustrates that a single inner module 120*b* is provided, the present disclosure is not limited thereto. For example, when it is necessary to increase a spread area inward in the transverse direction of the vehicle depending on the size of the width of the vehicle or the distance between a right lamp and a left lamp, two or more inner modules 120*b* may be provided.

Figure 3A:
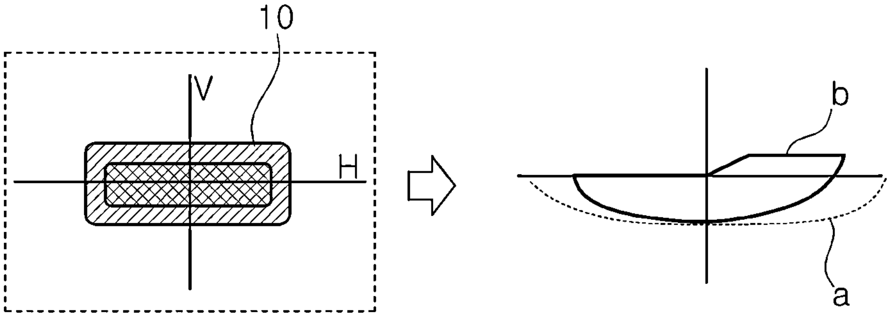
FIGS. 3A to 3C are views illustrating different light illumination areas depending on the position of the light source of the vehicle lamp incorporating a microlens array according to embodiments of the present disclosure.
Figure 3B:
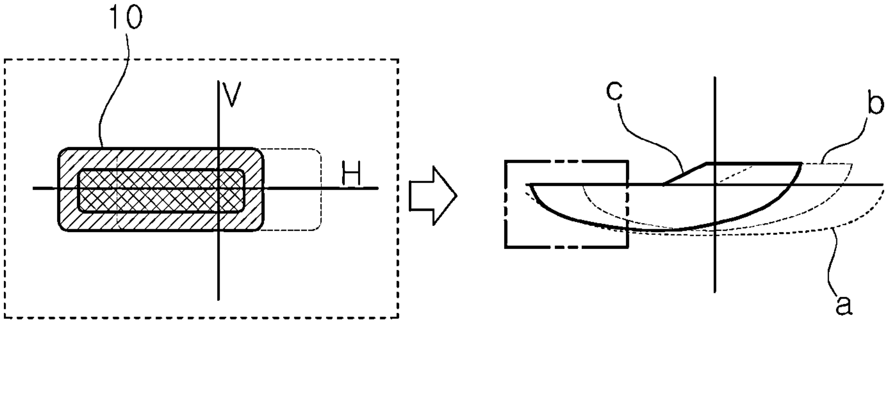
Figure 3C:
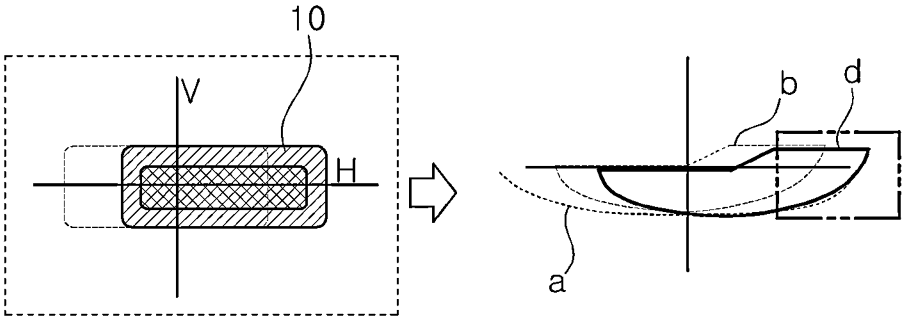

FIGS. 3A to 3C are views illustrating the difference between light illumination areas depending on the position of the light source of the vehicle lamp incorporating a microlens array. In each of FIGS. 3A to 3C, the left part indicates a beam pattern that is made when light from the light source 10 passes through the collimator lens 30, and the right part indicates a low beam pattern of light that has passed through the MLA module 20.

Here, FIG. 3A illustrates the beam pattern in the reference module 110 in which the LED of the light source 10 is disposed at the center. As illustrated in FIG. 3A, when the light source 10 is positioned at the center with respect to H-V and the light source module 100 is viewed from the front, both light that has passed through the collimator lens 30 and light that has passed through the MLA module 20 may have a beam pattern that is spread about the center with respect to H-V. Here, the MLA module has a small spread angle of light. Thus, as can be seen from the right part of FIG. 3A, it can be appreciated that a light illumination area b of a low beam emitted outward through the MLA module 20 has smaller right and left areas with respect to H-V when compared to a target light illumination area a required for a headlamp.

FIG. 3B illustrates a beam pattern of the eccentric module 120 in comparison with the beam pattern of the reference module 110. In the eccentric module 120, the light source 10 may be eccentric leftward with respect to H-V. As illustrated in FIG. 3B, it can be appreciated that, both light that has passed through the collimator lens 30 and light that has passed through the MLA module 20 may have the centers of light illumination areas that are eccentric leftward in comparison with the reference module 110. In this case, as can be seen from the right part of FIG. 3B, a light illumination area c of a low beam emitted outward through the MLA module 20 may be eccentric leftward from the light illumination area b of the low beam emitted outward through the MLA module 20 of the reference module 110. Thus, the light illumination area c may fill the left area of the target light illumination area a that is not met by the light illumination area b of the low beam of the reference module 110.

FIG. 3C illustrates a beam pattern of the eccentric module 120 in comparison with the beam pattern of the reference module 110. In the eccentric module 120, the light source 10 may be eccentric rightward with respect to H-V. As illustrated in FIG. 3C, it can be appreciated that, both light that has passed through the collimator lens 30 and light that has passed through the MLA module 20 have the centers of light illumination areas that are eccentric rightward in comparison with the reference module 110. In this case, as can be seen from the right part of FIG. 3C, a light illumination area d of a low beam emitted outward through the MLA module 20 may be eccentric rightward compared to the light illumination area b of the low beam of the reference module 110. Thus, the light illumination area d may fill the right area of the target light illumination area a that is not met by the light illumination area b of the low beam of the reference module 110.

Figure 4:
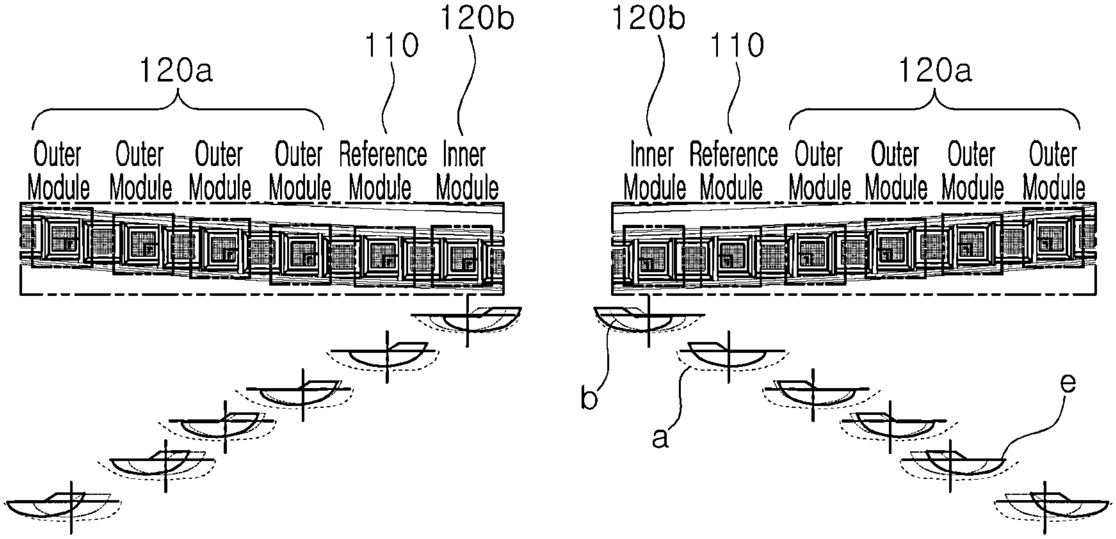
FIG. 4 is a view illustrating light illumination areas according to light source modules of vehicle lamps each incorporating a microlens array according to an embodiment of the present disclosure.
Figure 5:
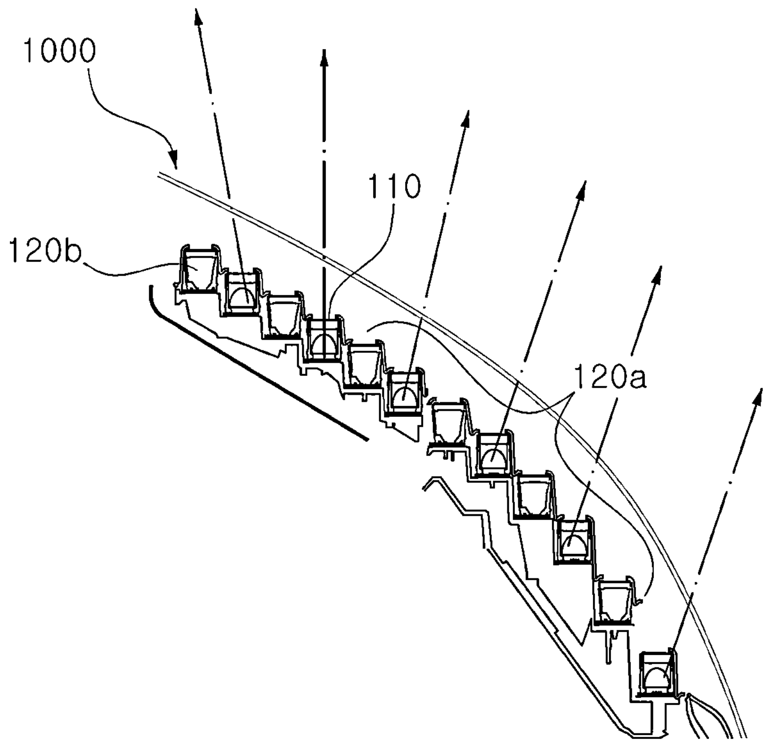
FIG. 5 is a side cross-sectional view illustrating a vehicle lamp incorporating a microlens array according to an embodiment of the present disclosure.

FIG. 4 is a view illustrating light illumination areas according to the light source modules of the vehicle lamps each incorporating a microlens array according to the present disclosure, and FIG. 5 is a side cross-sectional view illustrating a vehicle lamp provided to the right of a vehicle body among the vehicle lamps each incorporating a microlens array according to the present disclosure.

In FIG. 4, the left top part illustrates a plurality of light source modules 100 of the left lamp of the vehicle when the vehicle is viewed from the front, and the right top part illustrates a plurality of light source modules 100 of the right lamp of the vehicle when the vehicle is viewed from the front. In addition, in FIG. 4, the left bottom part illustrates patterns of low beams from the plurality of light source modules 100 of a left lamp 1000, and the right bottom part illustrates patterns of low beams from the plurality of light source modules 100 of a right lamp 2000.

As illustrated in FIGS. 4 and 5, when the vehicle is viewed from the front, it can be appreciated that the low beam from the inner module 120*b* disposed to the right with respect to a single reference module 110 is projected inward in the transverse direction of the vehicle in comparison with the beam emitted from the reference module 110 and the low beam from the outer modules 120*a* disposed to the left with respect to the reference module 110 is projected outward in the transverse direction of the vehicle in comparison with the beam emitted from the reference module 110.

In addition, in the example illustrated in FIG. 4, when the vehicle is viewed from the front, it can be appreciated that the low beam from the inner module 120*b* disposed to the left with respect to a single reference module 110 is projected inward in the transverse direction of the vehicle in comparison with the beam emitted from the reference module 110 and the low beam from the outer modules 120*a* disposed to the right with respect to the reference module 110 is projected outward in the transverse direction of the vehicle in comparison with the beam emitted from the reference module 110.

Figure 6:
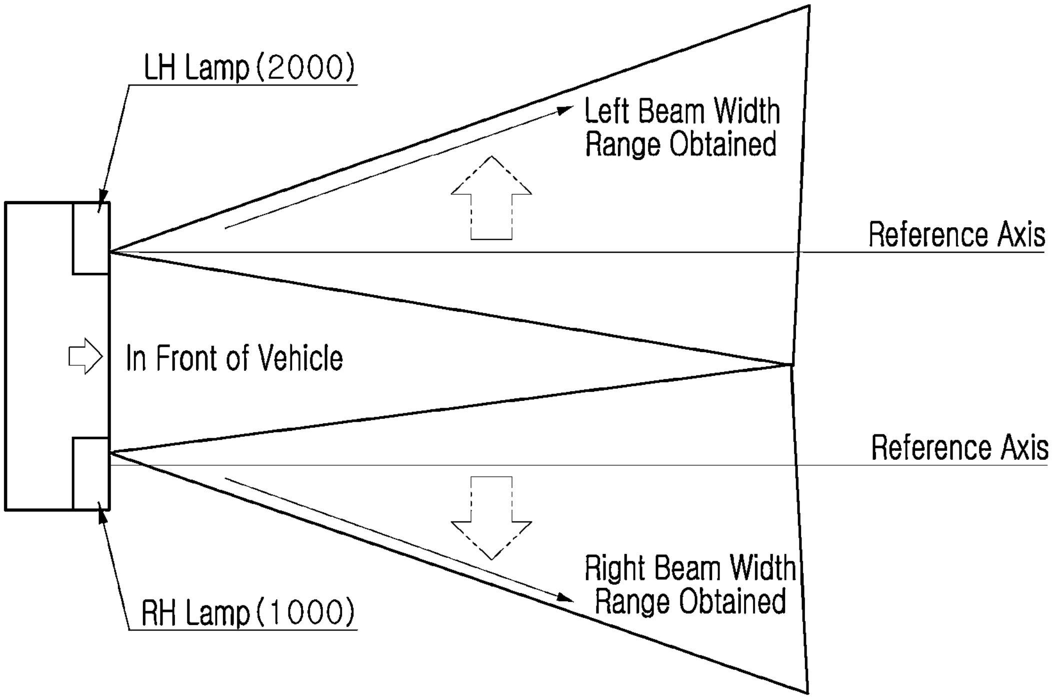
FIG. 6 is a view illustrating a light illumination area of the vehicle lamp incorporating a microlens array according to an embodiment of the present disclosure.

Thus, as illustrated in FIG. 6, it can be appreciated that, when the vehicle lamps according to the present disclosure are applied to the left lamp 1000 and the right lamp 2000 of a vehicle, it is possible to secure a larger width of light, directed to the right, left, and inner sides in the transverse direction of the vehicle, than when the lamps 1000 and 2000 are implemented as the same optical modules. Thus, it is possible to extend the light illumination areas of the vehicle lamps to the right and left in the transverse direction of the vehicle by overcoming the limitations of the illumination angle of the MLA module 20.

In addition, according to the present disclosure, in the plurality of light source modules 100, it is possible to generate different beam patterns from the plurality of light source modules 100 by attaching the light sources 10 to the PCBs 40 at different positions even in the case in which the PCB 40, the collimator lens 30, and the MLA module 20 provided in one of the light source modules 100 are configured the same as those in the others of the light source modules 100. That is, the major components of the light source module 100 may be shared, thereby reducing fabrication costs. Since the MLA modules 20 applied to hot zones and spread areas, respectively, are not required to be separately developed, development costs may be reduced.

Figure 7:
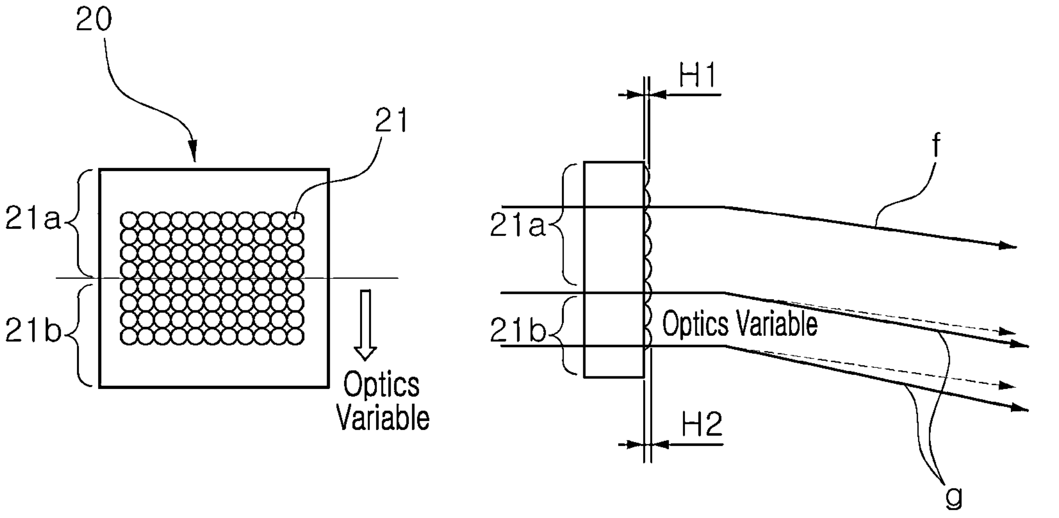
FIG. 7 is a view illustrating light refraction according to the lens height of a microlens array (MLA) module according to an embodiment of the present disclosure.
Figure 8:
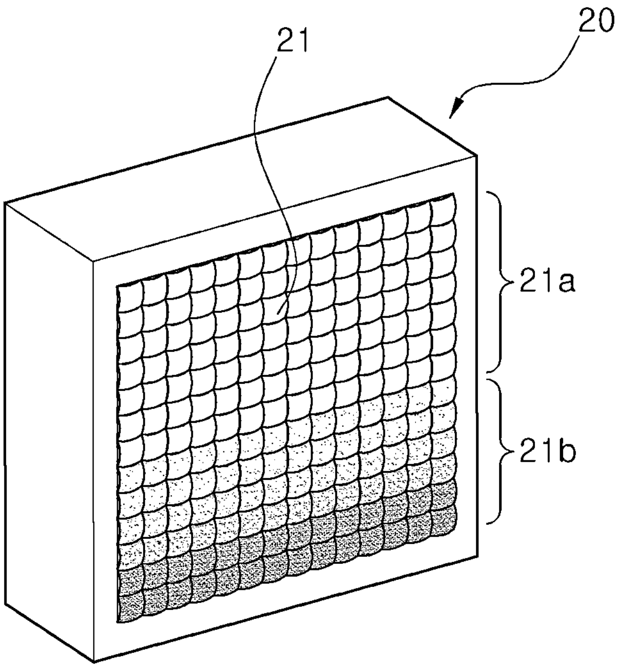
FIG. 8 is a perspective view illustrating the MLA module provided in a microlens array according to an embodiment of the present disclosure.
Figure 9:
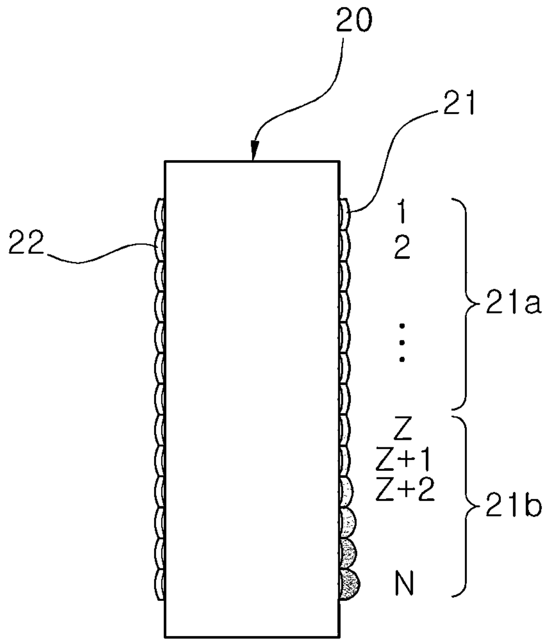
FIG. 9 is a side cross-sectional view illustrating the MLA module provided in the microlens array according to an embodiment of the present disclosure.
Figure 10:
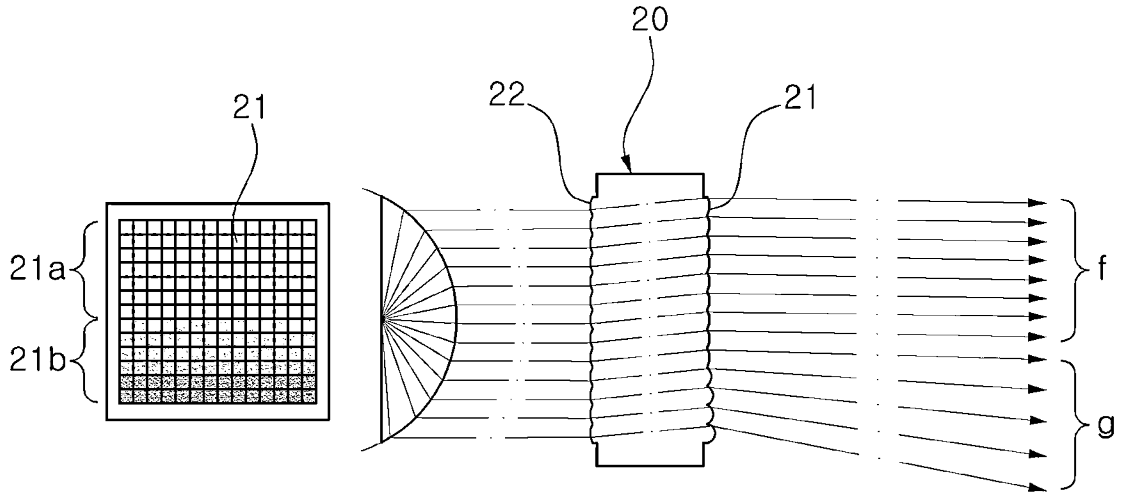
FIG. 10 is a view illustrating light refraction according to the lens area of the MLA module according to an embodiment of the present disclosure.

FIG. 7 is a view illustrating light refraction according to the lens height of an MLA module, FIG. 8 is a perspective view illustrating the MLA module provided in a microlens array according to the present disclosure, FIG. 9 is a side cross-sectional view illustrating the MLA module provided in the microlens array according to the present disclosure, and FIG. 10 is a view illustrating light refraction according to the lens area of the MLA module.

As illustrated in FIG. 8, an exit lens array 21 of the MLA module 20 provided in the microlens array according to an exemplary embodiment of the present disclosure may have an N×N array of micro lenses.

Respective lenses of an exit lens array 21 of an MLA module 20 of the related art may be configured to have the same height. That is, the heights of the lenses of an upper area 21_a_ of the exit lens array 21 and the heights of the lenses of a lower area 21_b_ of the exit lens array 21 may be equal. In this case, all of exit light beams exiting through respective lenses arranged in the top-bottom direction may be refracted in a predetermined pattern. Thus, in a related-art case, in order to obtain a predetermined or longer range of light that has passed through the upper area 21_a_ of the exit lens array 21, there is a limit to spread, in a downward direction, of the exit light that has passed through the lower area 21_b_ of the exit lens array 21.

In contrast, as schematically illustrated in FIG. 7, the MLA module 20 applied to the vehicle lamp according to the present disclosure may be configured so that the heights (i.e., a first height H1) of the lenses in the upper area 21_a_ of the exit lens array 21 are lower than the heights (i.e., a second height H2) of the lenses in the lower area 21_b_ of the exit lens array 21.

In this case, as illustrated in FIG. 10, among parallel light beams entering the MLA module 20 after passing through the collimator lens 30, exit light beams g passing through the lenses that have a higher height in the lower area 21_b_ may be more refracted than exit light beams f passing through the lenses that have a lower height in the upper area 21_a_. Thus, it is possible to further extend the light illumination area in the downward direction on the road while maintaining the maximum light illumination range and the intensity of light projected forward from the vehicle.

Here, as more clearly illustrated in FIG. 9, the lenses in the upper area 21_a_ of the exit lens array 21 of the MLA module 20 may have the same height from the first row to the Zth row. In contrast, descending down the rows of lenses in the lower area 21_b_ of the MLA module 20, the lenses may be gradually increased in height, in comparison with those in the upper row, so that the lenses in the lowest Nth row are the highest. Accordingly, as illustrated in FIG. 10, the exit light beams f that have passed through the first to Zth rows of lenses travel forward in a predetermined direction, and the exit light beams g that have passed through the (Z+1)th and lower rows may be refracted downward at a predetermined angle in a direction toward the road, thereby increasing illumination performance of the lamp in a short range. According to the example illustrated in FIGS. 9 and 10, the lenses arranged in the Nth row have the highest height. Here, the spread angle of light due to the lens height is greatest, and thus, the angle of light directing toward the road surface is also greatest.

In addition, in the example illustrated in FIG. 9, the lenses in the first row to the Z row in the upper area 21_a_ of the exit lens array 21 may have the same height in order to meet fundamental performance, such as light intensity, for a lamp, but the present disclosure is not limited thereto. For example, as long as the intensity of light for the headlamp is met, the heights of the lenses may gradually increase from the first row to the Nth row of the exit lens array 21.

FIGS. 11A to 11D are views illustrating light illumination areas according to the lens area of the MLA module.

Figure 11B:
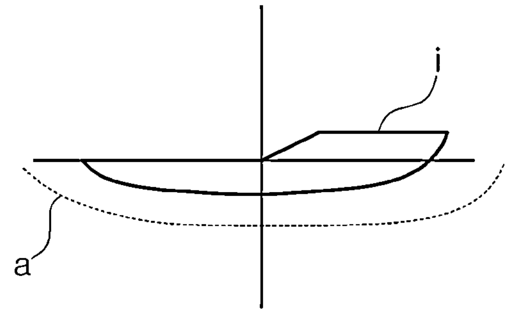
FIGS. 11A to 11D are views illustrating light illumination areas according to the lens area of the MLA module according to embodiments of the present disclosure.
Figure 11A:
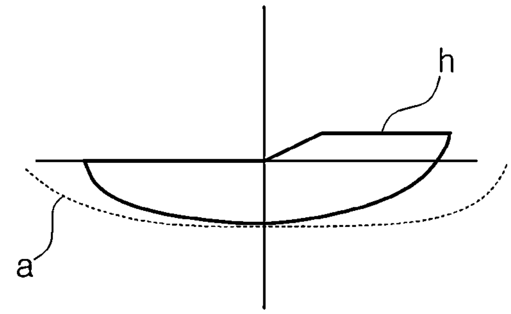

Here, FIG. 11A illustrates a beam pattern of light that has passed through the entire area of the exit lens array 21 of a single MLA module 20 of the vehicle lamp according to the present disclosure. As described above, due to the limitation of the illumination angle of the MLA module 20, light that has passed through the single MLA module may not fully illuminate both the right and left areas of the target light illumination area a. However, it can be appreciated that, when the MLA module 20 illustrated in FIG. 9 is provided, a light illumination area h of light that has passed through the entire area of the exit lens array 21 of the MLA module 20 may meet the target light illumination area a in the top-bottom direction with respect to H-V.

In addition, FIG. 11B illustrates a light illumination area i of light that has passed through the upper area 21_a_ of the N×N exit lens array 21 of a single MLA module 20 of the vehicle lamp according to the present disclosure. As can be seen from FIG. 11B, the light illumination area i of light that has passed through the upper area 21_a_ of the exit lens array 21 of the MLA module 20 may be insufficient to cover a lower area, in comparison with the target light illumination area a.

Figure 11C:
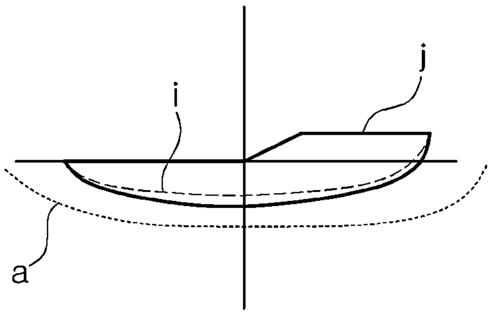

In addition, FIG. 11C illustrates a light illumination area j of light that has passed through a single row of lenses in the lower area 21_b_ of the N×N exit lens array 21 of a single MLA module 20 of the vehicle lamp according to the present disclosure. As can be seen from FIG. 11B, the light illumination area j of light that has passed through the single row of lenses in the lower area 21_b_ of the exit lens array 21 may cover a greater area in the downward direction toward the road surface, in comparison with the light illumination area i of light in FIG. 11 that has passed through the upper area 21_a_ of the exit lens array 21 the MLA module 20. However, it can be appreciated that there is still an area not illuminated with light, in comparison with the target light illumination area a.

Figure 11D:
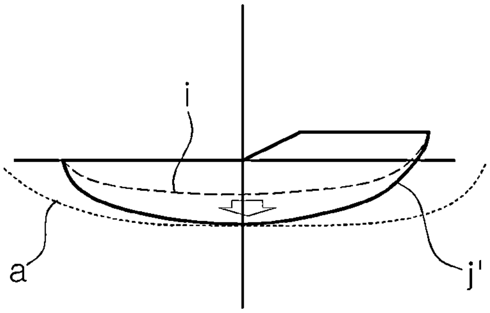

In addition, FIG. 11D illustrates a light illumination area j' of light that has passed through N number of rows in the lower area 21_b_ of the N×N exit lens array 21 of a single MLA module 20 of the vehicle lamp according to the present disclosure. As can be seen from FIG. 11D, the light illumination area j' of light that has passed through the N number of lenses in the lower area 21_b_ of the N×N exit lens array 21 may cover a greater area in the downward direction toward the road surface, in comparison with the light illumination area i of light that has passed through the upper area 21_a_ of the exit lens array 21 of the MLA module 20. The light illumination area j' covers the entire lower area of the target light illumination area a.

The MLA module 20 illustrated in FIG. 7 or 9 may be used in each of the light source modules 100 of the vehicle lamp described above with reference to FIGS. 1 to 6. In this case, by disposing the light sources 10 in the plurality of light source modules 100 at different positions while meeting fundamental performance requirements for the vehicle lamp, a transverse light illumination area (i.e., a spread area) may be increased. In addition, a light illumination area in a top-bottom direction may also be extended by suitably setting the heights of the exit lens arrays 21 of the MLA modules 20 of the light source modules 100.

The above description is only an example describing a technological scope of the present disclosure. Various changes, modifications, and replacements may be made by those having ordinary skill in the art without departing from the features of the present disclosure.

Therefore, the embodiments according to the present disclosure should be considered as illustrative rather than limitative of the technical idea of the present disclosure. The scope of the technical idea of the present disclosure is not limited by the embodiments and the accompanying drawings. The spirit and scope of the present disclosure should be interpreted by the appended claims and encompass all equivalents falling within the scope of the appended claims.

What is claimed is:

1. A vehicle lamp comprising:

a light source module comprising a light source configured to generate and emit light and a microlens array module provided in front of the light source and configured such that light enters the microlens array module, wherein the microlens array module comprises:

an incident lens array configured such that the light enters the incident lens array and comprising a plurality of incident lenses; and an exit lens array provided in front of the incident lens array, configured to receive the light that has entered the incident lens array and emit the light outward, and comprising a plurality of exit lenses, the exit lens array being configured such that heights of the exit lenses are different in a vertical direction of a vehicle, wherein the light source module comprises a plurality of light source modules in a transverse direction of the vehicle, and wherein the plurality of light source modules includes a reference module and eccentric modules, the light source of each of the eccentric modules being positioned eccentric with respect to the reference module in a light source unit.

2. The vehicle lamp according to claim 1, wherein each of exit lenses arranged in a plurality of upper rows, among the plurality of exit lenses, has a first height, and wherein each of exit lenses arranged in a plurality of lower rows, among the plurality of exit lenses, has a second height higher than the first height.

3. The vehicle lamp according to claim 1, wherein each of exit lenses arranged in a plurality of upper rows, among the plurality of exit lenses, has a first height, and wherein exit lenses arranged in a plurality of lower rows, among the plurality of exit lenses, are gradually increased in height as the row thereof is lower in the vertical direction so as to be higher than the first height.

4. The vehicle lamp according to claim 1, wherein:

the eccentric modules include an inner module disposed inside in the transverse direction of the vehicle with respect to the reference module and outer modules disposed outside in the transverse direction of the vehicle with respect to the reference module, the inner module is disposed such that the light source thereof is eccentric inward in the transverse direction of the vehicle with respect to the reference module in the light source unit, and the outer modules are disposed such that the light source of each of the outer modules is eccentric outward in the transverse direction of the vehicle with respect to the reference module in the light source unit.

5. The vehicle lamp according to claim 1, wherein:

the plurality of light source modules includes a plurality of left modules and a plurality of right modules provided to the left and right of the vehicle when the vehicle is viewed from the front, the plurality of left modules is configured such that the eccentric modules thereof are more eccentric leftward as being more left in the vehicle with respect to the reference module, and the plurality of right modules is configured such that the eccentric modules thereof are more eccentric rightward as being more right in the vehicle with respect to the reference module.

6. The vehicle lamp according to claim 1, wherein:

the plurality of light source modules comprises a plurality of Printed Circuit Boards (PCBs), each of which has a plurality of predetermined attachment positions, and the eccentric modules comprise the light sources attached to the PCBs at different attachment positions, such that the positions of the light sources are eccentric.

7. The vehicle lamp according to claim 1, wherein the light sources are Light Emitting Diodes (LEDs).

8. The vehicle lamp according to claim 1, wherein the reference module and the eccentric modules are configured such that the light source and the microlens array module of the reference module are the same as the light source and the microlens array module of each of the eccentric modules, with the light sources being attached to a plurality of Printed Circuit Boards (PCBs) at different attachment positions, respectively.

9. A vehicle comprising a vehicle lamp, wherein the vehicle lamp comprises: a light source module comprising a light source configured to generate and emit light; and a microlens array module provided in front of the light source and configured such that light enters the microlens array module, wherein the microlens array module comprises:

an incident lens array configured such that the light enters the incident lens array and comprising a plurality of incident lenses; and an exit lens array provided in front of the incident lens array, configured to receive the light that has entered the incident lens array and emit the light outward, and comprising a plurality of exit lenses, the exit lens array being configured such that heights of the exit lenses are different in a vertical direction of the vehicle, wherein the vehicle lamp comprises a plurality of light source modules in a transverse direction of the vehicle, and wherein the plurality of light source modules includes a reference module and eccentric modules, the light source of each of the eccentric modules being positioned eccentric with respect to the reference module in a light source unit.

10. A vehicle lamp comprising:

a light source module comprising a light source configured to generate and emit light and a microlens array module provided in front of the light source and configured such that light enters the microlens array module, wherein the microlens array module comprises:

an incident lens array configured such that the light enters the incident lens array and comprising a plurality of incident lenses; and an exit lens array provided in front of the incident lens array, configured to receive the light that has entered the incident lens array and emit the light outward, and comprising a plurality of exit lenses, wherein the exit lens array includes a plurality of first rows and a plurality of second rows, and the plurality of first rows is disposed below the plurality of second rows in a vertical direction of a vehicle, and wherein among the plurality of exit lenses, exit lenses arranged in the plurality of first rows have heights greater than heights of exit lenses arranged in the plurality of second rows.

11. The vehicle lamp according to claim 10, wherein the heights of exit lenses arranged in the plurality of first rows gradually increase as rows of the plurality of first rows are getting lower in the vertical direction.

* * * * *